(12) United States Patent
Nakamura

(10) Patent No.: US 6,253,150 B1
(45) Date of Patent: Jun. 26, 2001

(54) MOBILE NAVIGATION SYSTEM

(75) Inventor: Kazumasa Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/356,585

(22) Filed: Jul. 19, 1999

(30) Foreign Application Priority Data

Jul. 24, 1998 (JP) .................................................. 10-210077

(51) Int. Cl.⁷ ...................................................... G06G 7/78
(52) U.S. Cl. ............................. 701/208; 701/23; 701/25; 701/200; 180/170; 340/901; 340/988; 340/990; 340/995
(58) Field of Search .................................... 701/200, 201, 701/202, 208, 211, 23, 25; 340/901, 988, 990, 995; 348/148; 180/170

(56) References Cited

U.S. PATENT DOCUMENTS

| | | | |
|---|---|---|---|
| 5,177,685 | * | 1/1993 | Davis et al. .......................... 364/443 |
| 5,844,505 | * | 12/1998 | Van Ryzin ............................ 340/988 |
| 5,847,661 | * | 12/1998 | Ricci ..................................... 340/902 |

* cited by examiner

*Primary Examiner*—William A. Cuchlinski, Jr.
*Assistant Examiner*—Yonel Beaulieu
(74) *Attorney, Agent, or Firm*—Pearne & Gordon LLP

(57) ABSTRACT

A navigation ECU 1 retrieves stop-position data from a map data base 8, calculates a distance between a present position of a self vehicle and a stop position closest to the present position of the self vehicle, and judges whether or not the distance is within 300 m. If it is within 300 m, the ECU 1 generates a stop informing message or a slow-down warning. Further, when a distance between a present position of the self vehicle and the stop position closest to the present position is reduced to within 5 m, the ECU 1 instructs the driver of the self vehicle to cautiously look right and left.

9 Claims, 6 Drawing Sheets

MOBILE NAVIGATION SYSTEM

BACKGROUND OF THE INVENTION

1. Field of the Invention

The present invention relates to a mobile navigation system for guiding a driver of a vehicle from a present position to a destination place set by the driver. More particularly, the invention relates to a mobile navigation system having such a function that when the vehicle approaches a stop position at which a driver of a vehicle must stop the vehicle, the navigation system produces an acoustic or visual presentation informing the driver that the vehicle approaches the stop position to call the driver's attention to the vehicle approaching to the stop position.

2. Description of the Related Art

A mobile navigation system is widely used. In the navigation system, a driver of a vehicle enters a destination place to the navigation system. Upon entering the destination place into the navigation system, the navigation system looks up an appropriate route from an original point to the designation place in a road map data base (the route may be a route having the shortest distance from the start point to the destination, a route having the shortest time taken for the vehicle to reach the destination, or others), and guides the driver to the destination along the searched route by the utilization of a display or vocal guide.

In searching the appropriate route, some type of mobile navigation system utilizes traffic information (position data on traffic jam, road-closed information by accident or road construction or maintenance, lane-regulated locations) delivered from a traffic infrastructure system, in addition to the road map data base.

Conventionally, there is no mobile navigation system capable of notifying a driver of the stop positions located ahead of the traveling vehicle, such as an intersection with a stop road sign, an intersection with a yield road sign where a yielded road intersects the road where the vehicle is running, or a railroad crossing. When the driver first travels through a region with a number of intersections, although no traffic signal exists in particular, but the road signs instructing the driver to stop the vehicle and remain standing for watching around, he must frequently and carefully check whether the passing intersection is a stop position during his driving. As a result, heavy stress is imposed on the driver.

SUMMARY OF THE INVENTION

Accordingly, an object of the present invention is to provide a mobile navigation system which is capable of previously informing a driver of a vehicle that a stop position is located ahead of the vehicle, if the stop position is present ahead, thereby lessening stress of the driver driving the vehicle and calling a driver's attention to the stop position presence.

Another object of the present invention is to provide a mobile navigation system which is capable of issuing to a driver of a vehicle a slow-down warning to instruct the driver to decrease a vehicle speed in preparation for stopping at the stop position, viz., so as to allow the driver to stop the vehicle just before the stop position without fail.

Yet another object of the present invention is to provide a mobile navigation system which suppresses generation of a slow-down warning when the vehicle runs at such a speed as to allow the driver to safely stop the vehicle just before the stop position, thereby substantially eliminating troublesome in his driving and dullness of the driver's attention caused by his habituation of slow-down warnings frequently generated.

Still another object of the present invention is to provide a mobile navigation system which is capable of generating a slow-down warning, allowing for road conditions and driver's habits.

A further object of the present invention is to provide a mobile navigation system which enhances the effect of the slow-down warning by the utilization of screen display and voice, and other communication means.

DESCRIPTION OF THE PREFERRED EMBODIMENTS

Figure 1:
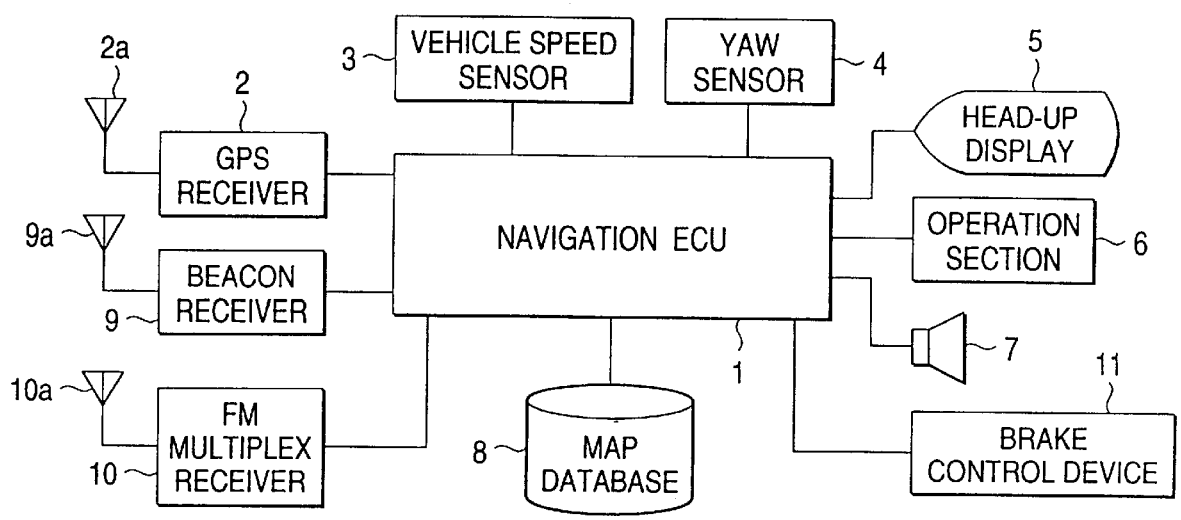
FIG. 1 is a block diagram showing an arrangement of a first embodiment of a mobile navigation system according to the present invention.

FIG. 1 is a block diagram showing an arrangement of a first embodiment of a mobile navigation system according to the present invention. In the figure, reference numeral 1 is a navigation ECU (electrical control unit). The ECU 1 includes a ROM storing a navigation program, a CPU for executing a necessary process in accordance with instructions of the navigation program, and a RAM for temporarily storing various data generated during the execution of the process by the CPU. Execution of the navigation program stored in the ROM produces the following actions: 1) to control the related portions of the mobile navigation system, 2) to measure a present position of the vehicle, 3) to search a route to a destination set by a driver, 4) to guide the vehicle to the destination through the searched route, and 5) others.

In FIG. 1, numeral 2 designates a GPS (global positioning system) receiver. This receiver receives radio waves from a plurality of GPS satellites by use of GPS antennae 2a, and measures a present position of a vehicle (referred to as a self vehicle) carrying thereon the navigation system shown in FIG. 1 on the basis of a time difference between arrival times at which the radio waves from the satellites arrive. Numeral 3 designates a speed sensor for producing a signal representative of a vehicle speed. A yaw sensor 4 produces a signal about a vehicle running direction. The navigation ECU 1 calculates position data (coordinates) of the present position of the running vehicle on the basis of the present position measured by the GPS receiver 2 and the signals output from the speed sensor 3 and the yaw sensor 4.

A headup display unit 5 is placed at a location so as to allow the driver to view the screen thereof by merely turning his eyes thereto. An example of the location is a dashboard in the car. The headup display unit 5 visually presents various information to the driver. Examples of displayed information are a road map including the vicinity of a present position of the vehicle, a route searched by the ECU 1, a simple configuration of an intersection or a fork in the road when the vehicle approaches the location.

An operation unit 6 includes a keyboard and joy stick. The operation unit 6 is used for operating the navigation system and designating a destination. A speaker 7 acoustically shows the driver a route to be chosen. A map data base 8 includes a data storing medium, e.g., a CD-ROM, for storing the road map information and road information to be given later, and a data read unit for reading necessary information from the data storing medium. Examples of the road information are 1) traffic control information including position data (coordinates) indicative of stop positions, lane control position and others, 2) coordinate values representative of various nodes on the map, such as intersections, and junction and branching points of express highways, 3) links each interconnecting adjacent nodes (referred to as links), 4) distances each between the adjacent roads and traveling costs (link cost), and 5) types of roads, such as national roads, prefectural roads, express highways and the like, stored in connection with the links. An example of the position data indicative of a stop position contained in the traffic control information (stop position data) is position data of the center of, for example, a stop intersection (at this intersection, a driver must stop the vehicle and remain standing for watching before moving the vehicle again).

A beacon receiver 9 receives traffic information distributed by a traffic infrastructure system installed (to be described) by use of a beacon antenna 9a. An FM multiplex receiver 10 receives information broadcasted by from the infrastructure system in an FM multiplex manner by use of an antenna 10a.

The infrastructure system grasps a traffic jam state in real time manner by use of the vehicle detecting devices by use of a number of vehicle detecting devices, e.g., cameras, are installed on and along main roads, such as national and prefectural roads. Further, the infrastructure system gathers traffic control information, such as position data on the places where the road is closed or the traffic flow is controlled by a traffic accident, road construction or the like, updated stop position data, and the like, and prepares traffic information in consideration with the traffic jam information. The infrastructure system sends the traffic information to the vehicle-information display device shown in FIG. 1, from road terminals, such as a number of beacons installed along the main roads and express highways, transmission antennae for FM multiplex broadcasting.

The ECU 1 stores the traffic information received by the beacon receiver 9 into the internal memory. The traffic information is referred to in searching for a desired route.

Numeral 11 designates a brake control device. When receiving a slow-down warning signal from the ECU 1 (to be described later), the brake control device 11 drives a brake actuator (not shown) to brake the vehicle.

The operation of the mobile navigation system will be described. When the mobile navigation system is started up, the processing of a routine shown in FIG. 2 starts. In a step S1, search conditions for routing (e.g., shortest and longest distances) are set. Then, in a step S2, the ECU 1 searches a route to a destination place which satisfies the search conditions set in the step S1, while referring to the traffic information stored in the map data base 8, and the traffic information received from the infrastructure system.

In the next step S3, the ECU 1 executes a process for guiding the driver to the destination place (to be described later). In the subsequent step S4, the ECU 1 measures a resent position of the self vehicle by use of a present position measured by the GPS receiver 2 and the signals received from the speed sensor 3 and the yaw sensor 4, and checks if the vehicle goes out of the route searched in the step S2.

If the vehicle is out of the searched route, the ECU 1 returns to the step S2, and searches again a route ranging to the destination set in the step S1 on the basis of the present position measured in the step S4. If the self vehicle is not out of the searched route, the ECU 1 goes to a step S5.

In the step S5, the ECU 1 judges whether or not the self vehicle reaches the destination place set, from the present position of the self vehicle measured in the step S4. If the self vehicle fails to reach the destination place, the answer is NO and the ECU 1 returns to the step S3, and repeats the sequence of steps S3 and S4, sometimes additionally step S2 till the answer to the step S5 is YES.

When the step S5 judges that the self vehicle reaches the destination, the answer to the step S5 is YES, and the operation of the mobile navigation system ends.

The guide process of the step S3 will be described. In this process, the driver is directed to turn to the left or right at an intersection on the searched route by use of the headup display unit 5 and the speaker 7 as in the conventional mobile navigation system (="route guide process"), and 2) when the self vehicle moves near the stop position, the ECU 1 informs the driver that the vehicle is near the stop position (="stop informing process").

The stop informing process 2) above will be described with reference to FIG. 3. In the process of the step S3 (FIG. 2), the "guide process" 1) above is carried out, and then execution of the "stop informing process" 2) shown in FIG. 3 starts. In this process, a step Sa1 is executed: ECU 1 measures a present position of the self vehicle by use of a present position measured by the GPS receiver 2 and the signals output from the speed sensor 3 and the yaw sensor 4.

A step Sa2 is then executed: ECU 1 judges the direction of the self vehicle from an output signal of the yaw sensor 4, and to look up in the map data base 8 the stop position closest to a present position of the self vehicle in the vehicle advancing direction. A step Sa3 is executed: ECU 1 calculates a distance from the searched stop position to the present position. A step Sa4 is executed: ECU 1 judges whether or not the self vehicle approaches a first zone within a first preset distance (300 m in this instance), measured from the looked-up stop position.

Figure 2:
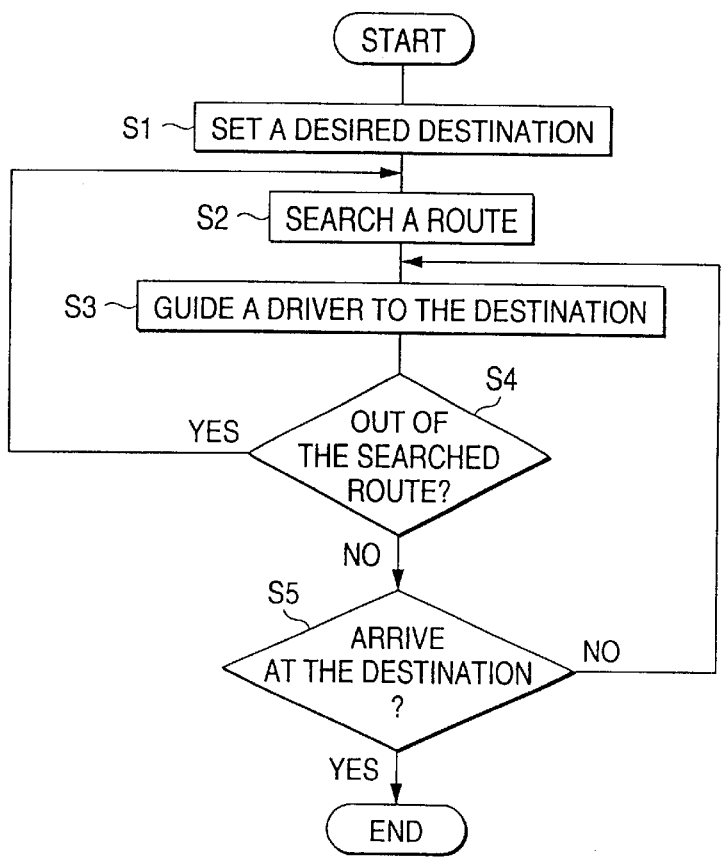
FIG. 2 is a flow chart showing a sequence of procedural steps of a main routine in the mobile navigation system of FIG. 1.
Figure 3:
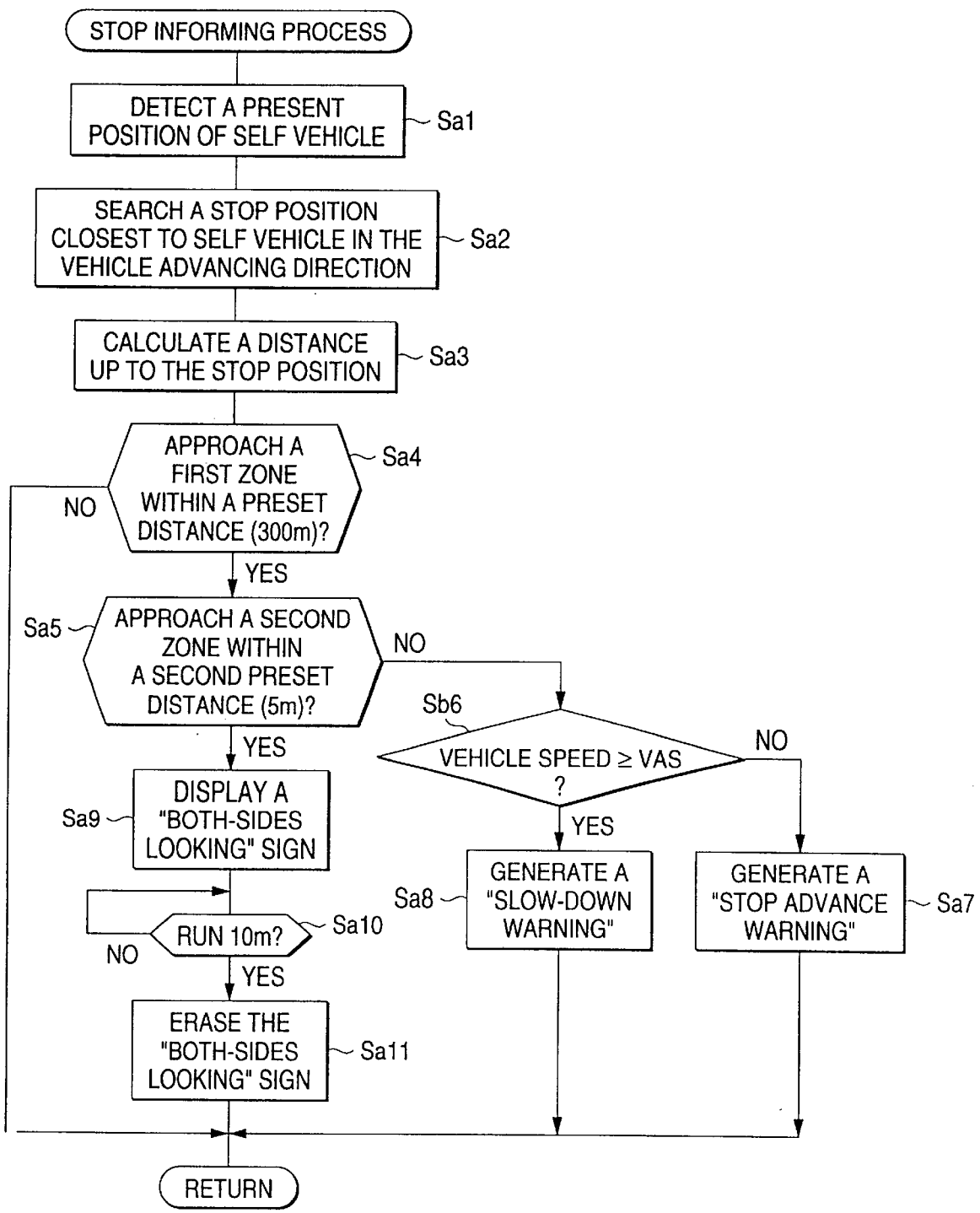
FIG. 3 is a flow chart showing a sequence of procedural steps of a stop informing process in the FIG. 1 mobile navigation system.

If the answer is NO (the self vehicle does not yet approach the first zone), the ECU 1 ends the stop informing process of FIG. 3, and returns to the step S4 (FIG. 2). The ECU 1 executes the process of the step S3. In this case, following the guide process 1), the step Sa1 of the stop informing process (FIG. 3) starts.

If the answer to the step Sa4 (FIG. 3) is YES (the self vehicle approaches to the first zone), the ECU 1 advances to a step Sa5. In this step, the ECU 1 judges whether or not the self vehicle approaches a second zone within a second preset distance (5 m in this instance), measured from the looked-up stop position. If the answer is NO (the self vehicle does not yet approach the second zone), the ECU 1 advances to a step Sa6 (a case where the answer is NO (the self vehicle approaches the second zone) will be described later).

Figure 4:
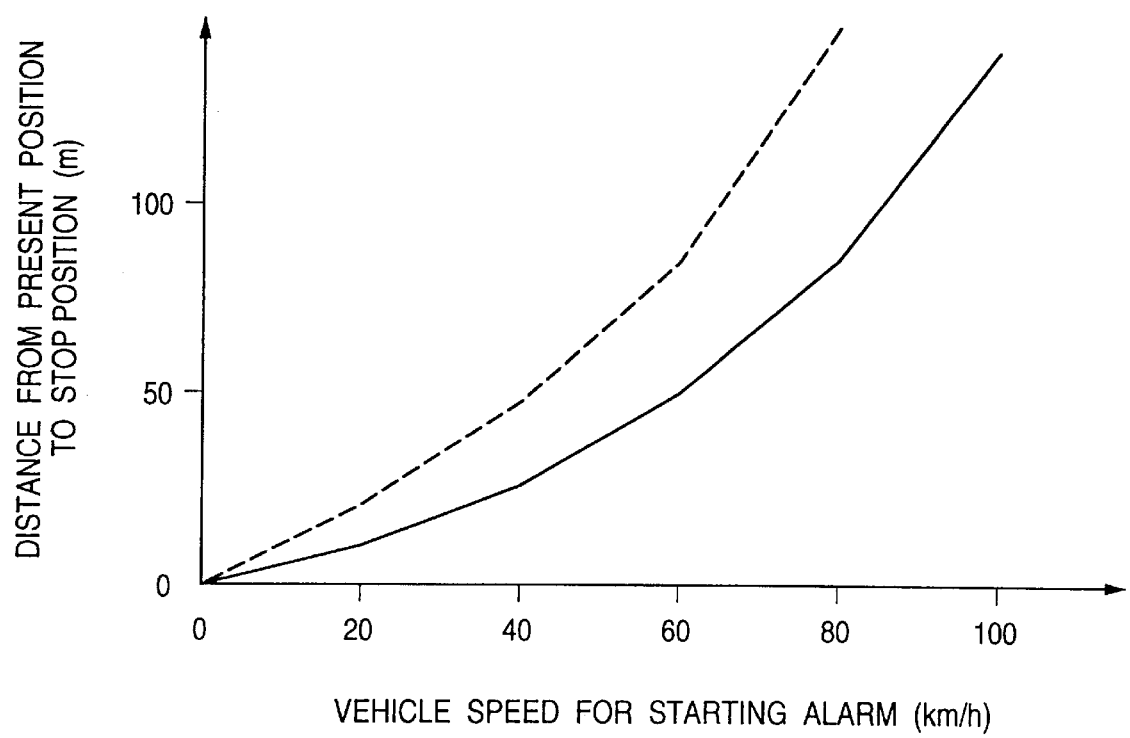
FIG. 4 is a graph showing a variation of a distance from a present position of a self vehicle to a stop position with respect to an alarm-start vehicle speed.

In the step Sa6, the ECU 1 calculates an alarm-start vehicle speed by use of a distance from the stop position to the present position, which is defined by a graph depicted in FIG. 4. A curve (indicated by a solid line) in the graph of FIG. 4 shows a relationship between a speed of the self vehicle and a stopping distance, and is given for reference and hence is not concerned with the judgement to issue a stop warning or a deceleration warning, handled in the present embodiment. A curve (indicated by a dotted line) representing a relation between a distance L from the stop position to the present position and an alarm-start vehicle speed Vas is calculated by using the following formula $$L=2Vas+Vas+Vas^2/2a=Vas(Vas/2a+3) \qquad (1)$$

In the equation (1), L is a distance (m) from the stop position to the present position; Vas is an alarm-start vehicle speed; and a is a predicted deceleration (m/s$^2$] of the self vehicle. The graph of FIG. 4 is depicted on the assumption that the deceleration a of the self vehicle is 0.4 G (3.92 m/s$^2$). 2Vas of the first term of the equation (1) indicates a distance the vehicle runs for a time period of 2 seconds on the assumption that a time from generation of a slow-down warning till the driver recognizes the warning is 2 seconds. Vas of the second term indicates a distance (free-run distance) the vehicle runs for a time period of 1 second, which is a time from an instance that the driver recognizes the slow-down warning till he starts to depress the brake pedal. Vas$^2$ of the third term is a braking distance the vehicle runs for a time period from the start of depressing the brake pedal till the vehicle actually stops.

Figure 5:
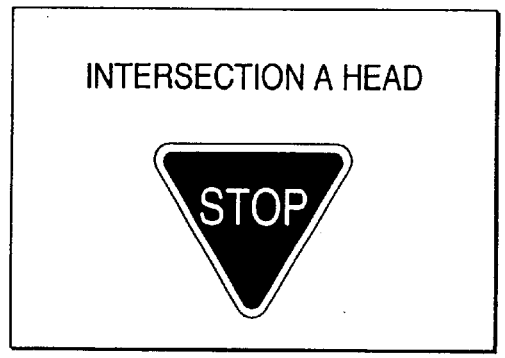
FIG. 5 is a diagram showing pictures sequentially displayed on the screen of a display unit when the stop informing process is executed.
Figure 5:
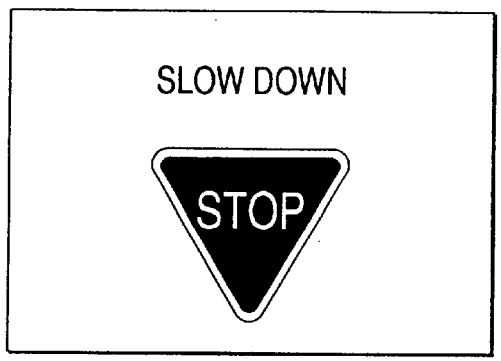
Figure 5:
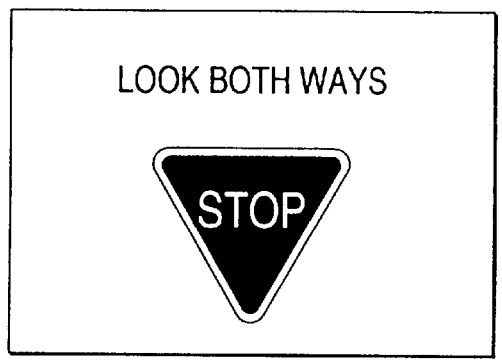

The navigation ECU 1 measures a present vehicle speed by use of an output signal of the speed sensor 3, and judges whether or not the measured speed is higher than the alarm-start vehicle speed Vas. When the measured vehicle speed of the self vehicle is lower than the alarm-start vehicle speed obtained from the FIG. 4 graph, the ECU 1 goes to a step Sa7. In this step, the ECU 1 causes the headup display unit 5 to display a stop advance warning sign shown in FIG. 5(*a*), and drives the speaker to generate a voice message "Stop intersection will come soon".

When the measured vehicle speed is higher than the alarm-start vehicle speed, the ECU 1 goes to a step S8*a*. In this step, it causes the headup display unit 5 to display a slow-down warning sign shown in FIG. 5(*b*), and the speaker 7 to generate a series of high-pitched, clear sounds "Beep, Beep, Beep". The brake control device 11 detects the generation of the slow-down warning, and drives a brake actuator (not shown), to thereby perform a preparatory braking operation. After the processing of the steps Sa7 or Sa8, the ECU 1 ends the execution of the stop informing process (FIG. 3) and executes the step S4 in FIG. 2.

Subsequently, the ECU 1 repeatedly executes a sequence of steps S4->S5->S3 (FIG. 2) [guide process (FIG. 3): Sa1->Sa2->Sa3->Sa4->Sa5->Sa6->Sa7 (or Sa8)]->S4. During this process execution, the "stop ahead" sign or the "slow-down warning" sign is displayed on the screen of the headup display unit 5, while a route guide is displayed in the conventional mobile navigation system.

When the driver takes a rout bypassing the stop position and is distanced apart from the stop position by at least 300 m (the answer to the step Sa4 is NO in FIG. 3), the ECU 1 ends the execution of the stop informing process (FIG. 3), and causes the headup display unit 5 to display a route guide on the screen thereof. When the self vehicle goes out of the searched route as the result of taking the bypassing route, the answer to the step S4 (FIG. 2) is NO, and the ECU 1 returns to the step S2 and another route is searched.

When the self vehicle approaches the second zone within 5 m measured from the stop position, the answer to the step Sa5 (FIG. 3) is YES, the ECU 1 advances to a step Sa9. In this step, the headup display unit 5 displays "both-sides looking" sign shown in FIG. 5(*c*), and the speaker 7 generates a voice message "Look right and left". Then, a step Sa10 is executed: the ECU 1 judges whether or not the self vehicle has run 10 m after the answer to the step Sa5 is YES.

If the answer to this step is YES (the vehicle has run 10 m), the ECU 1 advances to a step S111. In this step, the "both-sides looking" sign is erased from the screen of the headup display unit 5, and the route guide is displayed again as in the conventional mobile navigation system.

In the first embodiment mentioned above, the brake control device 11 may be removed. In this case, no preparatory braking operation is performed when the "slow-down warning" is generated in the step Sa8 (FIG. 3).

A second embodiment of a mobile navigation system according to the present invention will be described. The second embodiment (mobile navigation system) is different from the first embodiment (mobile navigation system) in that in the route guide process of the step S3 (FIG. 2), a guide process similar to that in the conventional mobile navigation system and a stop informing process are concurrently performed, and that the stop informing process is different from that in the first embodiment.

The construction of the mobile navigation system and the process of the main routine in the second embodiment are the same as those shown in FIGS. 1 and 2. Hence, description of those is omitted. The stop informing process carried out in the second embodiment will be described hereunder with reference to FIGS. 6 and 7. A case where a self vehicle, which runs along the searched route, is near a stop intersection will be used for explanation of the second embodiment.

Figure 6:
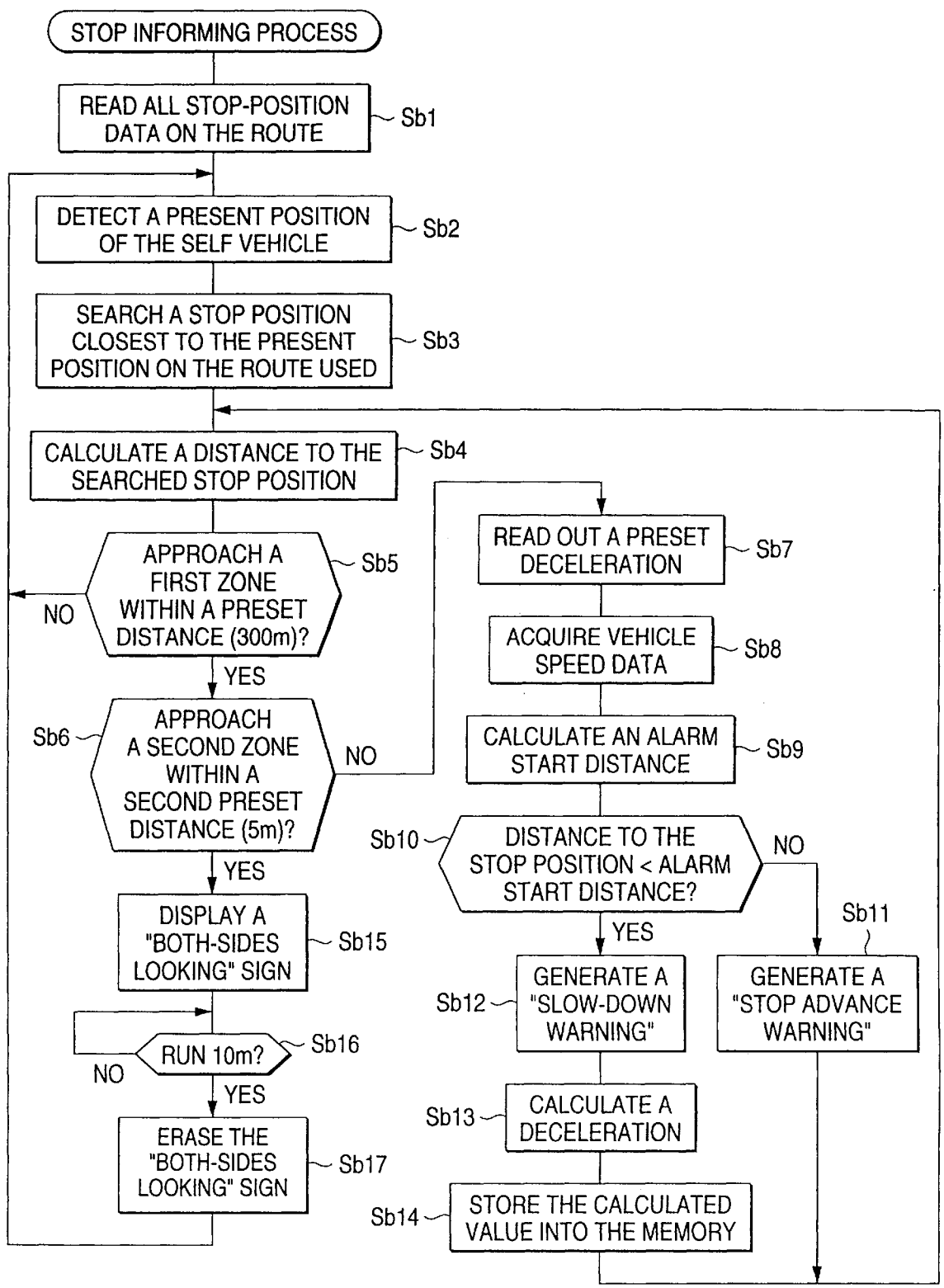
FIG. 6 is a diagram showing pictures sequentially displayed on the screen of a display unit when the stop informing process is executed in a mobile navigation system according to a second embodiment of the present invention.
Figure 7A:
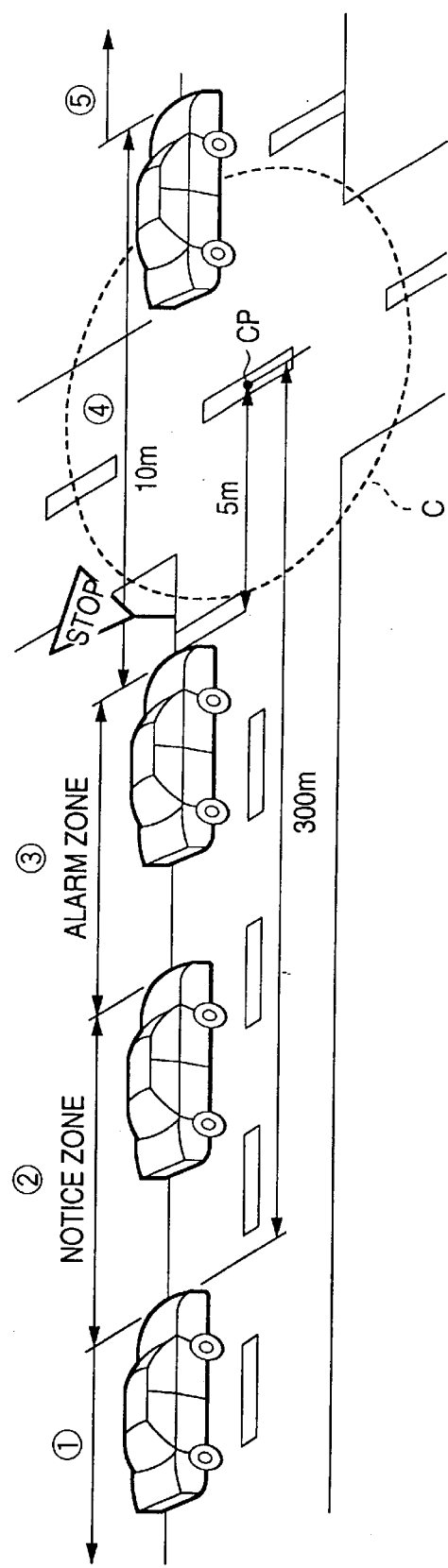
FIG. 7 is a diagram correspondingly showing sequential visual presentations to the driver and the positions of a running self vehicle during the execution of the stop informing process.

FIG. 6 is a flow chart showing a sequence of procedural steps of a stop informing process. FIG. 7 is a diagram showing positions of a self vehicle when it moves near a stop intersection and goes through the intersection, pictures sequentially displayed on the screen of the headup display unit 5, and voice messages and a series of high-pitched, clear sounds in a corresponding manner.

FIG. 7(*a*) shows a process of running of a self vehicle when it approaches a stop intersection C and passes the same. FIG. 7(*b*) shows a series of displays on the screen of the headup display unit 5, which are time sequentially arranged, and further the contents of vocal messages generated by the speaker 7, arranged over a range from (2) to (4) and to which double quotations are applied. The displays (1) to (5) are sequentially presented on the screen of the headup display unit 5 when the vehicle runs through zones (1) to (5) in FIG. 7(*a*).

A step Sb1 in the flow chart of FIG. 6 is executed: the ECU 1 reads out all the stop positions on the route searched in the step S2 (FIG. 2) from the map data base 8. When the mobile navigation system finds additional stop positions in the updated traffic regulation information, which is received from the traffic infrastructure system by use of the beacon receiver 9 and the FM multiplex receiver 10, the ECU 1 fetches those additional stop positions. In this case, the ECU 1 sorts those stop positions in the descending order of their distances to the present position of the self vehicle, and stores them into the RAM of the ECU 1.

The ECU 1 advances to a step Sb2: the ECU 1 detects a present position of the vehicle from a present position measured by the GPS receiver 2 and the output signals of the speed sensor 3 and the yaw sensor 4. A step Sb3 is executed: the ECU 1 stores data, which is representative of the stop position closest to the present position of the self vehicle, into the RAM of the ECU 1. (The data to be stored represents a coordinate value of the center CP of the stop intersection C in FIG. 7(*a*), in this instance.)

A step Sb4 is executed: the ECU 1 compares the stop-position data stored in the RAM of the ECU 1 with the present position data of the self vehicle to calculatively produce a distance to the stop position closest to the present position of the self vehicle. A step Sb5 is executed: the ECU 1 judges whether or not the distance calculated in the step Sb4 is within a preset distance (300 m in this instance) measured from the stop position. If the answer to the step Sb5 is NO (not within 300 m), the ECU 1 returns to the step Sb2, and repeats a sequence of steps Sb2−>Sb3−>Sb4−Sb5 till the vehicle approaches the zone within 300 m distanced from the closest stop position.

If the answer to the step Sb5 is YES (the distance to the stop position data detected in the step Sb3, from the present position of the self vehicle), the ECU 1 advances to a step Sb6. A sequence of steps subsequent to the step Sb6 (=stop informing process) is executed for informing the driver that the vehicle approaches the stop position located ahead. The stop informing process will be described with reference to FIG. 7 (in addition to FIG. 6).

The fact that the answer to the step Sb5 is NO in the flow chart shown in FIG. 6 indicates that the vehicle runs in the zone (1) in FIG. 7(*a*) (out of 300 m from the center CP of the stop intersection C). At this time, the headup display unit 5 displays a map of an area including the self vehicle at its present position, a mark indicative of an advancing direction of the vehicle, and a route searched (indicated by a bold line), as shown in (1) of FIG. 7(*b*), as in the conventional guide process.

The fact that the answer to the step Sb5 (FIG. 6) is YES indicates that the self vehicle enters a previous informing zone, i.e., a zone ((2) in FIG. 7(*a*). Then, a step Sb6 is executed: the ECU 1 judges as to whether or not a distance between the present position of the self vehicle and the stop position stored in the RAM of the ECU 1 is shorter than a distance (5 m in this instance) from the stop position to a position at which the vehicle is to be stopped (e.g., a stop line).

If the answer to the step Sb6 is NO (it is longer than 5 m), the ECU 1 jumps to a step Sb7. If the answer is YES (within 5 m), the ECU 1 proceeds to a step Sb15. Description will be continued on the assumption that the answer to the step Sb6 is NO.

If the answer is NO, the ECU 1 goes to the step Sb7. In this step, the ECU 1 reads out a deceleration (G) of the vehicle when it passes the past stop position, from a deceleration storage area previously allocated to the RAM of the ECU 1. In an initial state of the storage area where the past deceleration is not stored, a value of 0.2 (more precisely, about 1.96 m/s²) is stored therein in preparation for a slippery road surface. Accordingly, this value is read out.

A step Sb8 is executed: the ECU 1 calculates a present vehicle speed by use of an output signal of the speed sensor 3. A step Sb9 is executed: the ECU 1 calculates an alarm start distance Las from the deceleration value read out in the step Sb7 and the vehicle speed calculated in the step Sb8, by use of the following formula (2). The "alarm start distance" is a distance from a stop position to a point where a slow-down warning to instruct the driver to decrease the vehicle speed is generated.

$$Las = 2V + V + V^2/2a = V(V/2a+3) \quad (2)$$

In the above equation, Las is an alarm start distance, V is a vehicle speed (m/s), and a is a deceleration (m/S²) read out in the step Sb7. 2V of the first term of the equation (2) indicates a distance the vehicle runs for a time period of 2 seconds on the assumption that a time from generation of a slow-down warning till the driver recognizes the warning is 2 seconds. V of the second term indicates a distance (free-run distance) the vehicle runs for a time period of 1 second, which is a time from an instance that the driver recognizes the slow-down warning till he starts to depress the brake pedal. $V^2/2a$ of the third term is a braking distance the vehicle runs for a time period from the start of depressing the brake pedal till the vehicle actually stops.

Then, a step Sb10 is executed: the ECU 1 judges whether or not a distance from the stop position to the present position of the self vehicle is within the alarm start distance (the vehicle enters a region (3) in FIG. 7(*a*)). If the answer to the step Sb10 is NO (the former is longer than the latter), the ECU 1 jumps to a step Sb11. If the answer is NO (the former is shorter than the latter), the ECU 1 advances to a step Sb12.

If the answer to the step Sb10 is NO (the self vehicle is in the zone (2) in FIG. 7(*a*)), the ECU 1 goes to the step Sb11. In this step, the ECU 1 gives a stop advance warning to the driver and returns to the step Sb4. At this time, the headup display unit 5 displays a message "Stop intersection ahead" and a sign of "STOP" ((2) in FIG. 7(*b*)). Further, the speaker 7 produces a vocal message "Stop intersection will be reached soon". Then, the ECU 1 returns to the step Sb4.

If the distance from the stop position to the present position of the self vehicle is shorter than the alarm start distance (the vehicle enters a zone (3) in FIG. 7(*a*); the answer is YES), the ECU 1 advances to the step Sb12. In this step, the ECU 1 issues a slow-down warning to instruct the driver to decrease the vehicle speed.

At this time, the headup display unit 5 displays a message "Slow down" and a sign of "STOP", and the speaker 7 generates a series of high-pitched, clear alarm sounds, "Pi, Pi, Pi". Further, the brake control device 11 drives a brake actuator (not shown) to preparatorily brake the vehicle.

A step Sb13 is executed: the ECU 1 calculates a deceleration of the vehicle, i.e., a changing rate of the vehicle speed (calculated in the step Sb8) with respect to time. In the next step Sb14, the ECU 1 stores the calculated deceleration into the RAM of the ECU 1, and returns to the step Sb4.

Subsequently, the ECU 1 repeats sequences of steps Sb4 to Sb11 or Sb4 to Sb10, and Sb12 to Sb14 till the answer to the step Sb6 is YES (a present position of the self vehicle is put within a zone of 5 m measured from the stop position). During this process, the deceleration values calculated in the step Sb13 are stored into the deceleration storage area, successively.

When the self vehicle is within 5 m (the vehicle enters a zone (4) in FIG. 7(*a*)), the answer to the step Sb6 is YES, and the ECU 1 advances to the step Sb15. In this step, the headup display unit 5 displays a stream of characters "Look right and left" above a sign of "STOP" ((4) in FIG. 7(*b*)). At the same time, the speaker 7 produces a voice message "Look right and left" to urge the driver to cautiously look either side of the road.

A step Sb16 is executed to judge whether or not the self vehicle has run 10 m after the answer to the step Sb6 is YES. If the self vehicle has run 10 m (the vehicle enters a zone (5) in FIG. 7(*a*), the answer to the step Sb16 is YES, the ECU 1 advances to a step Sb17. Here, the step of the "both-sides looking" is completed.

Figure 7B:
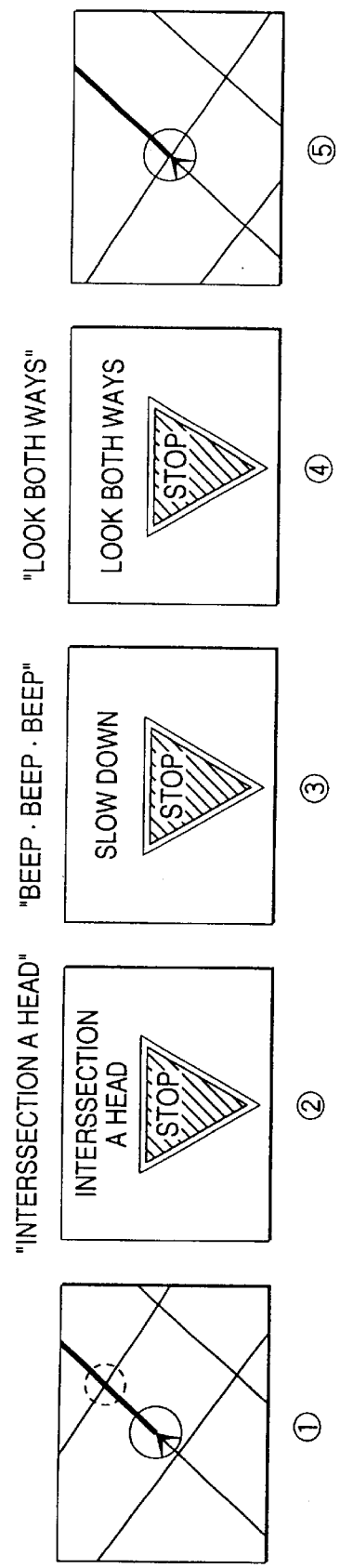

At this time, the headup display unit 5 displays a map of an area including the self vehicle at its present position, a mark M indicative of an advancing direction of the vehicle, and a route searched (indicated by a bold line), as shown in (5) of FIG. 7(b), as in the conventional guide process.

And the ECU 1 returns to the step Sb2, and stores the closest stop position data into the RAM of the ECU 1, and repeats the above sequences of steps till the vehicle reaches the destination place.

Thus, when the vehicle runs at such a speed that an alarm start distance calculated from the set deceleration and the detected vehicle speed is longer than a distance between the present position of the self vehicle and the stop position till the vehicle approaches the zone within 300 m (measured from the stop position) and then the zone of 5 m (measured from the stop position), the ECU 1 executes the "both-sides looking" process while not issuing a deceleration warning.

When the driver moves the self vehicle at such a speed that the answer to the step Sb10 is always NO during a time period from an instant that the answer to the step Sb5 is YES till the answer to the step Sb6 is YES, the ECU 1 executes the "both-sides looking" process while not executing the deceleration-warning generation process.

In the second embodiment thus far described, in the step Sb1, the ECU 1 reads out all the stop positions on the searched route from the map data base. Alternatively, during the running of the self vehicle, a stop position closest to a present position of the self vehicle on the route on which the self vehicle runs (the route may be any of other routes than a route set by the driver) may be read out every time the self vehicle passes a stop position.

In the second embodiment, a deceleration value is set at 2.0 G in the initial state of the memory area. An alternative is such that before driving, the driver enters road conditions (for example, icy, dry and wet road surfaces), and weather, and the deceleration data read out in the initial state is set in accordance with the road conditions entered.

In the first and second embodiments, stop positions, blind places, places where traffic accident frequently occurs may optionally be stored into the road map database by the driver, and the stored position data may be handled in the stop informing process. In a further alternative, by obtaining the data such as driver's age, experience and a sphere of the driver's activity from a customer database or upon his request, the positions to be handled in the stop informing process, the alarm start distance, or the alarming volume can be programmed into the mobile navigation system on the basis of the data beforehand.

What is claimed is:

1. A mobile navigation system for a vehicle, comprising:
    storing means for storing information on a road map and stop positions at which a driver of the vehicle must stop the vehicle, said stop positions being contained in the road map;
    present-position detecting means for detecting a present position of the vehicle; and
    stop informing means for informing the driver of a stop position closest to the vehicle in the vehicle advancing direction based upon said detected present position of the vehicle and said stop positions stored in said storing means.

2. A mobile navigation system according to claim 1, wherein said present-position detecting means includes a global positioning system.

3. A mobile navigation system for a vehicle having present-position detecting means for detecting a present position of the vehicle, destination setting means for setting a place for which the vehicle is destined, route searching means for searching a route to said set destination place, and guide means for guiding a driver of the vehicle to said set destination place based upon said searched route and said detected present position of the vehicle, wherein said mobile navigation system comprises:
    storing means for storing information on a road map and stop positions at which a driver of the vehicle must stop the vehicle, said stop positions being contained in the road map;
    retrieving means for retrieving stop positions present on said searched route; and
    stop informing means for informing the driver of the stop position closest to the vehicle based upon said detected present position of the vehicle and said retrieved stop positions.

4. A mobile navigation system according to claim 3, wherein said present-position detecting means includes a global positioning system. stored in said storing means.

5. A mobile navigation system for a vehicle having present-position detecting means for detecting a present position of the vehicle, destination setting means for setting a place for which the vehicle is destined, route searching means for searching a route to said set destination place, and guide means for guiding a driver of the vehicle to said set destination place based upon said searched route and said detected present position of the vehicle, wherein said mobile navigation system comprises:
    storing means for storing information on a road map and stop positions at which a driver of the vehicle must stop the vehicle, said stop positions being contained in the road map;
    retrieving means for retrieving said stop positions present on said route; and
    stop informing means for informing the driver of the stop position closest to the vehicle based upon said detected present position of the vehicle, as determined by said global positioning system, and said retrieved stop positions, said stop informing means comprising:
        advance informing means for informing the driver that said stop position closest to the present position of the vehicle is present ahead when the vehicle approaches a first zone within a first preset distance measured from said closest stop position, and
        watching instruction means for instructing the driver to cautiously look right and left when the vehicle will pass said closest stop position when the vehicle approaches a second zone within a second preset distance measured from said closest stop position.

6. A mobile navigation system according to claim 5, wherein said stop informing means includes alarming means operating such that said alarming means detects a speed of the vehicle before the vehicle enters said second zone, and generates a slow-down warning based upon the detected vehicle speed to instruct the driver to decrease the vehicle speed to a speed low enough to stop the vehicle.

7. A mobile navigation system according to claim 6, wherein said alarming means alters a relationship between the vehicle speed and a distance to generate the slow-down warning depending on a deceleration of the vehicle when the vehicle approaches the stop position.

8. A mobile navigation system according to claim 6 or 7, further comprising speed reducing means for reducing the vehicle speed depending on an operation of said alarming means.

9. A mobile navigation system according to claim 8, wherein said present-position detecting means includes a global positioning system.

* * * * *

UNITED STATES PATENT AND TRADEMARK OFFICE
CERTIFICATE OF CORRECTION

PATENT NO. : 6,253,150 B1
DATED : June 26, 2001
INVENTOR(S) : Nakamura

It is certified that error appears in the above-identified patent and that said Letters Patent is hereby corrected as shown below:

<u>Column 3,</u>
Line 15, after "medium.", please begin new paragraph starting with -- Examples of the road information… --.

<u>Column 4,</u>
Line 4, please delete "resent", and insert therefor -- present --.

<u>Column 7,</u>
Line 11, after "position.", please begin new paragraph starting with -- If the answer to the step… --.
Line 67, please delete "(m/S$^2$)", and insert therefor -- (m/s$^2$) --.

<u>Column 10,</u>
Line 16, after "system.", please delete -- stored in said storing means. --.

Signed and Sealed this

Ninth Day of July, 2002

Attest:

Attesting Officer

JAMES E. ROGAN
*Director of the United States Patent and Trademark Office*